United States Patent
Airaud et al.

(10) Patent No.: US 9,424,045 B2
(45) Date of Patent: Aug. 23, 2016

(54) DATA PROCESSING APPARATUS AND METHOD FOR CONTROLLING USE OF AN ISSUE QUEUE TO REPRESENT AN INSTRUCTION SUITABLE FOR EXECUTION BY A WIDE OPERAND EXECUTION UNIT

(71) Applicant: ARM LIMITED, Cambridge (GB)

(72) Inventors: Cedric Denis Robert Airaud, Saint Laurent du Var (FR); Luca Scalabrino, Biot (IT); Frederic Jean Denis Arsanto, Antibes (FR); Guillaume Schon, Golfe Juan (FR); Frederic Claude Marie Piry, Cagnes-sur-Mer (FR); Albin Pierick Tonnerre, Sophia Nice (FR)

(73) Assignee: ARM Limited, Cambridge (GB)

( * ) Notice: Subject to any disclaimer, the term of this patent is extended or adjusted under 35 U.S.C. 154(b) by 804 days.

(21) Appl. No.: 13/752,621

(22) Filed: Jan. 29, 2013

(65) Prior Publication Data
US 2014/0215189 A1 Jul. 31, 2014

(51) Int. Cl.
| G06F 9/30 | (2006.01) |
| G06F 9/318 | (2006.01) |
| G06F 9/345 | (2006.01) |
| G06F 9/38 | (2006.01) |

(52) U.S. Cl.
CPC .......... *G06F 9/3836* (2013.01); *G06F 9/30014* (2013.01); *G06F 9/30196* (2013.01)

(58) Field of Classification Search
CPC .................................................. G06F 9/30196
USPC ........................................................ 712/214
See application file for complete search history.

(56) References Cited

U.S. PATENT DOCUMENTS

| 5,163,139 A | * | 11/1992 | Haigh .................. G06F 9/3889 712/206 |
| 5,862,067 A |   | 1/1999 | Mennemeier et al. |
| 5,913,047 A | * | 6/1999 | Mahalingaiah ..... G06F 9/30032 712/213 |
| 6,233,671 B1 |  | 5/2001 | Abdallah et al. |

(Continued)

FOREIGN PATENT DOCUMENTS

| EP | 0 724 221 | 7/1996 |
| EP | 0 947 917 | 10/1999 |

(Continued)

OTHER PUBLICATIONS

Shen et al., "Modem processor design fundamentals of superscalar processors", Oct. 2002, Beta ed., pp. 126-127.*

*Primary Examiner* — Andrew Caldwell
*Assistant Examiner* — Yuqing Xiao
(74) *Attorney, Agent, or Firm* — Nixon & Vanderhye P.C.

(57) ABSTRACT

An apparatus and method includes execution circuitry including a wide operand execution unit configured to allow up to N bits of operand data to be processed during execution of a single instruction. Decoder circuitry decodes and generates, for each instruction, at least one control data block identifying an operation to be performed by the execution circuitry and at least two re-combineable control data blocks for the instruction. Issue queue control circuitry then allocates a slot in the issue queue for each of the at least two data blocks and up to M bits of associated operand data, and marks those allocated slots to identify that they contain re-combineable control data blocks. The issue queue control circuitry issues the combined block to said wide operand execution unit along with the operand data contained in each of the allocated slots for said at least two control data blocks.

21 Claims, 6 Drawing Sheets

(56) References Cited

U.S. PATENT DOCUMENTS

| | | | |
|---|---|---|---|
| 6,349,383 B1 * | 2/2002 | Col | G06F 9/3004 712/202 |
| 6,367,067 B1 | 4/2002 | Odani et al. | |
| 6,633,971 B2 * | 10/2003 | Peng | G06F 9/3824 712/218 |
| 6,675,376 B2 * | 1/2004 | Ronen | G06F 9/3001 708/205 |
| 6,785,802 B1 * | 8/2004 | Roy | G06F 9/3836 712/216 |
| 6,834,337 B1 | 12/2004 | Mitchell et al. | |
| 6,889,318 B1 * | 5/2005 | Wichman | G06F 9/3853 712/226 |
| 6,944,744 B2 * | 9/2005 | Ahmed | G06F 9/30036 712/20 |
| 7,096,343 B1 | 8/2006 | Berenbaum et al. | |
| 7,302,554 B2 * | 11/2007 | Yamazaki | G06F 9/30036 712/214 |
| 8,677,102 B2 * | 3/2014 | Uesugi | G06F 9/3017 712/220 |
| 2002/0087955 A1 * | 7/2002 | Ronen | G06F 9/3001 717/151 |
| 2002/0124157 A1 * | 9/2002 | Le | G06F 9/383 712/225 |
| 2005/0198473 A1 | 9/2005 | Ford | |
| 2005/0228969 A1 | 10/2005 | Audrain et al. | |
| 2006/0020772 A1 * | 1/2006 | Hussain | G06F 9/3017 712/210 |
| 2007/0260855 A1 * | 11/2007 | Gschwind | G06F 9/30014 712/213 |
| 2009/0327665 A1 | 12/2009 | Sperber et al. | |

FOREIGN PATENT DOCUMENTS

| | | |
|---|---|---|
| EP | 2 309 383 | 4/2011 |
| GB | 2 352 066 | 1/2001 |
| WO | WO 98/06042 | 2/1998 |
| WO | WO 99/50740 | 10/1999 |

* cited by examiner

DATA PROCESSING APPARATUS AND METHOD FOR CONTROLLING USE OF AN ISSUE QUEUE TO REPRESENT AN INSTRUCTION SUITABLE FOR EXECUTION BY A WIDE OPERAND EXECUTION UNIT

BACKGROUND

The present invention relates to a data processing apparatus and method for controlling use of an issue queue used to temporarily store decoded instructions prior to their execution within execution circuitry of the data processing apparatus.

The execution circuitry of a data processing apparatus is typically arranged to perform a sequence of operations on data in response to a series of instructions fetched from memory. Typically, the fetched instructions will be passed to decoder circuitry which will generate, for each instruction, a corresponding control data block (also referred to herein as a micro-operation or micro-op) identifying an operation to be performed by the execution circuitry in order to execute that instruction.

Often, the control data blocks generated as a result of decoding the fetched instructions are temporarily buffered within an issue queue, prior to those control data blocks being issued to the execution circuitry in order to cause the corresponding operations to be performed. By temporarily buffering such decoded instructions within an issue queue, this enables a steady of stream of instructions to be available for issue to the execution circuitry. Further it provides a mechanism to support out of order execution, where issue control circuitry can decide in which order to issue to the execution circuitry the various control data blocks in the issue queue, with the aim of increasing throughput.

An instruction not only encodes the operation to be performed in response to that instruction, but typically identifies operand data to be processed during execution of the operation. Often, this operand data is identified with reference to one or more registers within a register file of the data processing apparatus, those registers storing the required operand data.

Traditionally, an issue queue provided a plurality of slots, each slot being used to store a control data block output by the decoder circuitry. However, the operand data was not stored within the issue queue, and instead was separately provided from the register file to the execution circuitry.

However, more recently, issue queues have been developed where each slot has been extended in size to allow operand data to be held in that slot with the associated control data block. By such an approach, this can alleviate a bandwidth constraint that may otherwise arise in respect of access to the register file. In particular, a number of register read ports will be provided for reading operand data from the registers of the register file. For example, two register read ports may be provided to allow the contents of two 64-bit registers to be read simultaneously from the register file. The number of read ports will clearly limit the amount of data that can be read simultaneously from the register file, but it is very expensive to increase the number of read ports. By allowing the issue queue to hold the operand data for control data blocks held within the slots of the issue queue, this increases flexibility as to when and how that operand data can be made available. For example, that operand data can still be read from the register file, but alternatively may be provided to the issue queue via another mechanism, such as via a forwarding path used to provide the issue queue with a copy of result data output by the execution circuitry to the register file. When the operand data is provided via the forwarding path, this removes the requirement to read that particular operand data from the register file, hence alleviating the above-mentioned bandwidth constraint.

The execution circuitry will typically include a number of execution units. Whilst most of those execution units might typically be arranged to process a standard width of operand data when performing the operation specified by each control data block issued to them (for example 128 bits of operand data in the particular example where the instructions encoding those operations specify as operand data two 64-bit registers), at least one of the execution units may be configured to process a wider width of operand data during performance of the operation specified by each control data block. For example, a Single Instruction Multiple Data (SIMD) execution unit may be configured to receive two items of operand data, but where each item of operand data is larger than the standard 64 bits (for example the SIMD execution unit may be configured to process two 128-bit operands). As another example, a multiply-accumulate (MAC) unit may be configured to process more than two items of operand data, with each of those items having the standard data width (for example, a particular MAC unit may be configured to process three 64-bit operands). For the purposes of the present application, such execution units that are configured to process a wider width of operand data will be referred to as wide operand execution units.

Whilst the use of such wide operand execution units can significantly improve performance of the data processing apparatus, their presence gives rise to a significant cost issue in respect of the issue queue, in situations where the issue queue is configured to store the required operand data for each control data block within the associated slot of the issue queue. In particular, the issue queue is a large module within the data processing apparatus, and the size has to be increased significantly if each slot is to have sufficient space to store all of the operand data specified by instructions to be executed within such wide operand execution units. Further, it is often the case that relatively few of the instructions in the instruction set will specify such wider operand data. As a result, there are many applications where the area and power consumption costs associated with increasing the size of the issue queue to accommodate the wider operand data are considered prohibitive.

Various prior art techniques have been described whereby certain instructions are divided into multiple smaller instructions for executing separately, see for example U.S. Pat. No. 6,233,671, EP 0,947,917, US 2009/327665, WO-A-9806042, U.S. Pat. No. 7,096,343, US 2005/228969, US 2005/198473, U.S. Pat. No. 6,834,337, U.S. Pat. No. 6,367,067.

It would be desirable to provide a mechanism that allowed the performance benefits of using wide operand execution units to be retained, but whilst alleviating the associated size requirements of the issue queue.

SUMMARY

Viewed from a first aspect, the present invention provides a data processing apparatus, comprising: execution circuitry comprising a number of execution units, including a wide operand execution unit configured to allow up to N bits of operand data to be processed during execution of a single instruction; decoder circuitry configured to decode each instruction to be executed by the execution circuitry in order to generate for each instruction at least one control data block identifying an operation to be performed by the execution circuitry in order to execute that instruction; an issue queue having a plurality of slots, each slot configured to store one control data block generated by the decoder circuitry along with up to M bits of operand data associated with that control data block, where M is less than N; issue queue control circuitry configured to issue control data blocks and associated operand data from the issue queue to the execution circuitry for processing; the decoder circuitry being responsive to an instruction suitable for execution by said wide operand execution unit and requiring more than M bits, but no more than N bits, of operand data to be processed during execution, to generate at least two re-combineable control data blocks for that instruction; the issue queue control circuitry configured to allocate a slot in the issue queue for each of said at least two re-combineable control data blocks and up to M bits of associated operand data, and to mark those allocated slots to identify that they contain re-combineable control data blocks; the issue queue control circuitry being configured, responsive to a determination that said at least two re-combineable control data blocks are to be issued to said wide operand execution unit, to re-combine said at least two re-combineable control data blocks into a combined control data block, and to issue the combined control data block to said wide operand execution unit along with the operand data contained in each of the allocated slots for said at least two re-combineable control data blocks.

In accordance with the present invention, when the decoder circuitry encounters an instruction suitable for execution by the wide operand execution unit, it generates at least two re-combinable control data blocks for that instruction, and each of those re-combinable control data blocks is allocated into a slot of the issue queue, with those allocated slots being marked to identify that they contain re-combinable control data blocks. When issue queue control circuitry determines that those re-combinable control data blocks are to be issued to the wide operand execution unit, it re-combines them into a combined control data block, and issues the combined control data block to the wide operand execution unit, along with the operand data contained in each of the allocated slots for those re-combinable control data blocks. When issuing the combined control data block, the operand data from each of the allocated slots will typically be merged, for example by concatenating items of operand data from each of the slots. By such an approach, even though only a maximum of M bits of operand data is stored in each slot of the issue queue, where M is less than the amount of operand data N that can be processed by the wide operand execution unit, the wide operand execution unit can still be sent from the issue queue a single combined control data block specifying the required operation, along with the N bits of operand data to be processed by that operation, hence allowing the performance benefits of the wide operand execution unit to be fully utilised.

In contrast to the earlier described prior art techniques that divided certain instructions into multiple small instructions for separate execution, in accordance with the present invention the multiple re-combinable control data blocks that are stored within the issue queue are not intended to be executed separately but instead are re-combined into a single combined control data block for issuance to the execution circuitry, hence enabling the performance benefits of using the wide operand execution unit to be retained.

In one embodiment, N is equal to 2M, and hence two re-combineable control data blocks are generated for each instruction that is suitable for execution by the wide operand execution unit, each re-combineable control data block being allocated to one slot and storing M bits of the operand data. However, in alternative embodiments, N may be greater than 2M, and hence more than two re-combineable control data blocks would be generated for each instruction that is suitable for execution by the wide operand execution unit. In yet a further embodiment, N may be less than 2M (but greater than M), so that two re-combineable control data blocks would be generated for each instruction that is suitable for execution by the wide operand execution unit, but at least one of those re-combineable control data blocks would have less than M bits of operand data associated therewith.

There are a number of ways in which the slots allocated to the re-combinable control data blocks can be identified. In one embodiment, the issue queue control circuitry maintains status information for each slot of the issue queue, said status information identifying which slots have been allocated for said at least two re-combineable control data blocks.

There are a number of ways in which the status information may identify which slots have been allocated to the re-combinable control data blocks. In one embodiment, the status information comprises a combine field associated with each slot, and the issue queue control circuitry is configured to set a value in each combine field to identify whether the associated slot contains one of said re-combineable control data blocks.

In one embodiment, for at least one of the slots allocated for said at least two re-combineable data blocks, the issue queue control circuitry is configured to identify within the associated combine field each other slot that contains one of said at least two re-combineable control data blocks. In one particular embodiment, this only needs to be done within the associated combine field for one of those slots, since that one of the slots is considered to be a master slot, and the one or other slots containing the other re-combinable control data blocks are considered to be slave slots.

In one embodiment, the status information includes ready for execution information set by the issue queue control circuitry to identify which slots contain a control data block that is ready to be executed by the execution circuitry.

In one embodiment, for the slots allocated for said at least two re-combineable control data blocks, the issue queue control circuitry is configured to defer setting the ready for execution information for any of those slots until all of said at least two re-combineable control data blocks are ready for execution. This ensures that none of those re-combinable control data blocks are marked as ready for execution until the situation has been reached where those re-combinable control data blocks can be recombined to form the combined control data block for issuance to the wide operand execution unit.

In one particular embodiment, when all of said at least two re-combineable control data blocks are ready for execution, the issue queue control circuitry is configured to set the ready for execution information to identify, as ready for execution, a predetermined one of the slots allocated for said at least two re-combineable control data blocks. In particular, in one embodiment the ready for execution information is set to identify the earlier mentioned master slot as being ready for execution.

There are a number of ways in which the issue queue control circuitry can determine whether the control data block in a particular slot is ready for execution. In one embodiment, the issue queue control circuitry determines, for each slot, whether the control data block allocated to that slot is ready to be executed, dependent on whether the associated operand data is available in that slot. Hence, the control data block in a particular slot will not be marked as ready for execution until all of its associated operand data is available.

In one embodiment, the status information includes an operand status field for each slot, and the issue queue control circuitry is configured to set said operand status field when the associated operand data is available within said slot. This provides a simple and effective mechanism for keeping track of when the operand data for each control data block is available.

In one embodiment, the issue queue control circuitry is configured to receive information from the execution circuitry as to the availability of each execution unit to receive at least one control data block for processing, and the issue queue control circuitry determines, for each slot, whether the control data block allocated to that slot is ready to be executed, dependent on whether the execution unit capable of processing that control data block is available. In one embodiment, this information can be used in combination with the earlier mentioned information indicative of whether the operand data is available, in order to decide whether any particular control data block is ready to be executed.

Whilst in some embodiments instructions may be executed in order, in other embodiments the instructions may be allowed to be executed out of order. However, when out of order execution is allowed, there will often be certain ordering constraints that still need to be observed. In one such embodiment, the status information further comprises ordering constraint information, and the issue queue control circuitry is configured to determine that the control data block allocated to a particular slot is not ready to be executed if the ordering constraint information identifies at least one other slot that contains a control data block that requires processing prior to the control data block in the particular slot.

The issue queue control circuitry can be configured in a variety of ways. However, in one embodiment, the issue queue control circuitry is configured to issue up to X control data blocks to the execution circuitry per issue cycle. In such embodiments, the data processing apparatus may further comprise arbitration circuitry configured to perform an arbitration operation when the ready for execution information set by the issue queue control circuitry identifies more than X slots as containing a control data block that is ready to be executed by the execution circuitry. As discussed earlier, in one embodiment, for the slots that have been allocated to said at least two re-combinable control data blocks, only one of those slots will be identified as containing a control block that is ready to be executed, and hence the presence of multiple slots allocated to the re-combinable control data blocks does not impact correct operation of the arbitration circuitry.

In one embodiment, the data processing apparatus further comprises a register file configured to store operand data, and a forwarding path configured to directly provide, to the issue queue, result operand data generated by said execution circuitry for storage within the register file. In such an embodiment, the issue queue may have operand access circuitry connected to both the register file and the forwarding path and configured to store, within each slot, the associated operand data for the control data block allocated to that slot. This enhances flexibility with regards to provision of the operand data to the issue queue.

The wide operand execution unit can take a variety of forms. In one embodiment, the wide operand execution unit comprises a SIMD (Single Instruction Multiple Data) execution unit configured to perform an operation in parallel on a plurality of data values, and the instruction suitable for execution by said wide operand execution unit is a SIMD instruction, each item of operand data specified by the SIMD instruction comprising multiple data values.

In one embodiment, the execution circuitry is configured to execute instructions from an instruction set, and the instruction suitable for execution by said wide operand execution unit is a complex instruction within said instruction set, said complex instruction specifying a sequence of operations, and said complex instruction specifying more items of operand data than are specified by at least one other instruction in said instruction set.

In one particular embodiment, said complex instruction is a multiply-accumulate (MAC) instruction specifying both a multiply operation to be performed using first and second operand data, and an accumulate operation to be performed using third operand data and the result operand data generated by performance of said multiply operation. Further, the wide operand execution unit comprises a multiply accumulate (MAC) unit configured to receive the first, second and third operand data as inputs, and to perform the multiply operation and the accumulate operation specified by the MAC instruction.

In one embodiment, the issue queue control circuitry will always aim, as a default position, to recombine the at least two re-combinable control data blocks into a combined control data block to be issued to the wide operand execution unit. However, in one embodiment, the issue queue control circuitry may be configured, responsive to detection of a predetermined condition, to determine that said at least two re-combineable control data blocks should not be issued as said combined control data block to said wide operand execution unit, and to instead issue each of said at least two re-combineable control data blocks separately to the execution circuitry along with its associated operand data.

The predetermined condition can take a variety of forms. In one embodiment, if the operation specified by each of said at least two re-combineable control data blocks is capable of being performed by the execution circuitry independently of the operation specified by each other of said at least two re-combineable control data blocks, said predetermined condition is detected by the issue queue control circuitry if a time threshold is reached without at least one of: (i) the operand data for at least one of the re-combineable control data blocks being available in the associated slot, and (ii) said wide operand execution unit being available. Hence, for example, in situations where at least some of the operand data is delayed and/or the wide operand execution unit is not available for a prolonged period, the issue queue control circuitry can determine that it is no longer appropriate to wait to be in a position where the re-combineable control data blocks can be recombined and issued to the wide operand execution unit. Instead, the at least two re-combineable control data blocks can be issued independently to the execution circuitry for processing.

For instance, considering the earlier mentioned example of a complex instruction, namely a MAC instruction, rather than using the MAC unit the multiply operation may be issued to an arithmetic logic unit (ALU) in a first clock cycle, and then the accumulate operation can be issued to the ALU in a later clock cycle. As another example, considering a SIMD instruction, the operation specified by the SIMD instruction can be performed on some of the operand data by issuing a first of the re-combinable control data blocks to the execution circuitry (whether the SIMD unit or some other unit within the execution circuitry), and then in a later clock cycle the operation specified by the SIMD instruction can be performed on the remainder of the operand data by issuing another of the re-combinable control data blocks to the execution circuitry.

The slots of the issue queue can be configured in a variety of ways. In one embodiment, the plurality of slots comprise a plurality of standard slots and a number of further slots reserved for re-combineable control data blocks, and the issue queue is responsive to said decoder circuitry generating said at least two re-combineable control data blocks, to allocate a first of said at least two re-combinable control data blocks to one of said standard slots, and to allocate each other of said at least two re-combineable control data blocks to one of said further slots. The standard slot that is allocated to the first of the re-combinable control data blocks is then considered to be the master slot, with each of the one or more further slots then being considered to be a slave slot.

Viewed from a second aspect, the present invention provides a method of controlling use of an issue queue within a data processing apparatus having execution circuitry comprising a number of execution units, including a wide operand execution unit configured to allow up to N bits of operand data to be processed during execution of a single instruction, the method comprising: decoding each instruction to be executed by the execution circuitry in order to generate for each instruction at least one control data block identifying an operation to be performed by the execution circuitry in order to execute that instruction; providing the issue queue with a plurality of slots, each slot for storing one control data block generated by the decoding step along with up to M bits of operand data associated with that control data block, where M is less than N; issuing control data blocks and associated operand data from the issue queue to the execution circuitry for processing; at said decoding step, responsive to an instruction suitable for execution by said wide operand execution unit and requiring more than M bits, but no more than N bits, of operand data to be processed during execution, generating at least two re-combineable control data blocks for that instruction; allocating a slot in the issue queue for each of said at least two re-combineable control data blocks and up to M bits of associated operand data, and marking those allocated slots to identify that they contain re-combineable control data blocks; at said issuing step, responsive to a determination that said at least two re-combineable control data blocks are to be issued to said wide operand execution unit, re-combining said at least two re-combineable control data blocks into a combined control data block, and issuing the combined control data block to said wide operand execution unit along with the operand data contained in each of the allocated slots for said at least two re-combineable control data blocks.

Viewed from a third aspect, the present invention provides a data processing apparatus, comprising: execution means comprising a number of execution unit means, including a wide operand execution unit means for processing up to N bits of operand data during execution of a single instruction; decoder means for decoding each instruction to be executed by the execution means in order to generate for each instruction at least one control data block identifying an operation to be performed by the execution means in order to execute that instruction; an issue queue means having a plurality of slot means, each slot means for storing one control data block generated by the decoder means along with up to M bits of operand data associated with that control data block, where M is less than N; issue queue control means for issuing control data blocks and associated operand data from the issue queue means to the execution means for processing; the decoder means, responsive to an instruction suitable for execution by said wide operand execution unit means and requiring more than M bits, but no more than N bits, of operand data to be processed during execution, for generating at least two re-combineable control data blocks for that instruction; the issue queue control means for allocating a slot means in the issue queue means for each of said at least two re-combineable control data blocks and up to M bits of associated operand data, and for marking those allocated slot means to identify that they contain re-combineable control data blocks; the issue queue control means, responsive to a determination that said at least two re-combineable control data blocks are to be issued to said wide operand execution unit means, for re-combining said at least two re-combineable control data blocks into a combined control data block, and for issuing the combined control data block to said wide operand execution unit means along with the operand data contained in each of the allocated slot means for said at least two re-combineable control data blocks.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
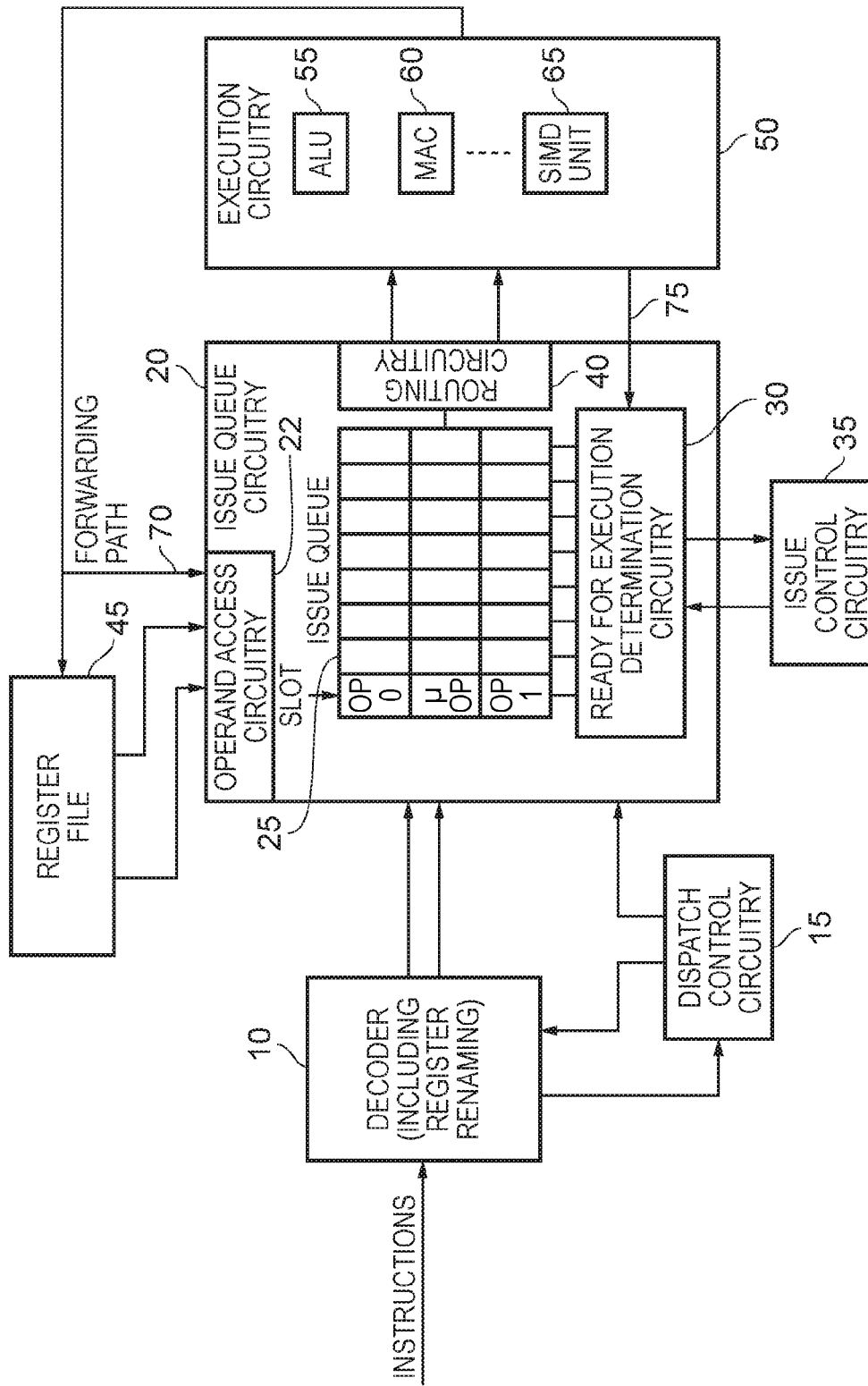
FIG. 1 is a block diagram of a data processing apparatus in accordance with one embodiment.

FIG. 1 is a block diagram of a data processing apparatus in accordance with one embodiment. The data processing apparatus includes a decoder 10 for decoding a sequence of instructions fetched from memory, the decoder 10 generating, for each instruction, a corresponding micro-op identifying an operation to be performed by the execution circuitry 50 in order to execute that instruction.

Typically, for each instruction, the decoder will generate a single micro-op, but in accordance with one embodiment the decoder can in some instances generate more than one re-combinable micro-op which are intended to be recombined in due course prior to issuance to the execution circuitry 50.

In one embodiment, the data processing apparatus supports out-of-order execution of instructions, and as will be understood by those skilled in the art the decoder may additionally include register renaming circuitry to support such out-of-order execution. In particular, register renaming is a technique used to avoid unnecessary serialization of program operations imposed by the reuse of registers by those operations.

Issue queue circuitry 20 is provided containing an issue queue 25 having a plurality of slots, each slot being arranged to store one micro-op generated by the decoder 10, along with associated operand data OP0 and OP1. In one embodiment, each slot is of a size sufficient to store up to M bits of operand data in association with each micro-op. In one particular embodiment, M is 128 bits, and hence each slot can store two 64-bit operands in association with a micro-op.

Dispatch control circuitry 15 is used to coordinate the activities of the decoder circuitry 10 and the issue queue circuitry 20, in order to ensure that there is an available slot to be allocated within the issue queue 25 for each micro-op generated by the decoder 10. Hence, if the issue queue 25 is full, the dispatch control circuitry will stall the operation of the decoder circuitry 10 until such time as one or more slots in the issue queue become available (for example, due to their stored micro-ops having been issued to the execution circuitry 50).

As each micro-op is dispatched from the decoder 10 to the issue queue circuitry 20, it is allocated into an available slot of the issue queue, and the associated operand data is then stored within that slot at some point prior to the micro-op being issued to the execution circuitry 50. In one embodiment, operand access circuitry 22 is provided for receiving the operand data and storing it in the required slot. In one embodiment, each item of operand data may be obtained directly from the register file 45 via one of its read ports, or alternatively may be received via a forwarding path 70 connected to an output of the execution circuitry 50, in order to allow result data generated by the execution circuitry, and required as operand data for a future operation, to be provided directly to the issue queue circuitry, thereby avoiding the need to subsequently read it from the register file 45 once that data has been stored into the register file.

The issue queue circuitry 20 further comprises ready for execution determination circuitry 30 for maintaining status information for each of the slots of the issue queue 25 and for using that status information to determine which slots contain micro-ops that are ready for execution by the execution circuitry 50. As will be discussed in more detail later with reference to FIG. 2, a variety of criteria may be used to determine whether each micro-op is ready for execution, including availability information provided over path 75 from the various execution units of the execution circuitry 50 indicative of whether those execution units are available to receive micro-ops.

Information about which slots contain micro-ops that are ready for execution is then passed from the ready for execution determination circuitry 30 to the issue control circuitry 35, which is configured to apply an arbitration operation in order to determine which slots should have their stored micro-ops issued to the execution circuitry each issue cycle. In one embodiment, up to two micro-ops can be issued to the execution circuitry per cycle, and hence in the event that more than two slots contain micro-ops that are ready for execution, the issue control circuitry will apply an arbitration operation in order to determine which two micro-ops should be issued to the execution circuitry 50. More details of the operation of the ready for execution determination circuitry 30 and the issue control circuitry 35 will be provided later with reference to FIG. 2.

On the basis of control signals issued by the issue control circuitry 35 to identify which slots contain micro-ops to be issued to the execution circuitry 50, the routing circuitry 40 will then route the selected micro-ops and their associated operand data to the relevant execution unit(s) within the execution circuitry 50. As will be understood by those skilled in the art, the execution circuitry 50 will typically comprise a plurality of execution units, such as an arithmetic logic unit (ALU) 55, a multiply-accumulate (MAC) unit 60, a Single Instruction Multiple Data (SIMD) unit 65, etc. Individual micro-ops will typically be issued to the execution unit that is appropriate having regards to the operation specified by that micro-op.

In accordance with one embodiment, at least one of the execution units of the execution circuitry 50 is a wide operand execution unit. In the particular example illustrated in FIG. 1, both the MAC unit 60 and the SIMD unit 65 are wide operand execution units, since each unit can operate on a wider width of operand data than the standard width. In particular, considering the example where a typical instruction will specify two source registers, each containing a 64-bit item of operand data, then the standard width will be 128 bits, and as discussed earlier each slot is capable of storing 128 bits of operand data. However, a MAC instruction may specify more than two items of operand data, and in one embodiment will specify three items of operand data, each being 64-bit in length. Similarly, a SIMD instruction will typically specify operands that are larger than 64-bits, and in one example may specify two 128-bit operands.

In both the MAC and SIMD examples discussed above, it will be appreciated that the operand data specified by a MAC instruction or a SIMD instruction cannot be accommodated within a single slot of the issue queue 25. Rather than increasing the size of the slots to allow such operand data to be accommodated, which would have a significant cost implication on the issue queue circuitry 20, the data processing apparatus of FIG. 1 is arranged to decode such instructions so as to form multiple re-combinable micro-ops for each such instruction. In particular, in one embodiment, two micro-ops are generated for each such instruction. Each of the two micro-ops is allocated to its own slot within the issue queue 25, and both micro-ops are marked as being re-combinable. The issue queue circuitry 20 is then arranged, prior to issuing those re-combinable micro-ops to the execution circuitry 50, to recombine them to form a single combined micro-op, with the combined micro-op then being issued to the relevant execution unit of the execution circuitry 50. The operand portions of both slots can then be used to store the required operand data, such that up to 2M bits of operand data can be provided to the execution unit in association with the combined micro-op.

This enables the performance benefits of such wide operand execution units to be maintained, without requiring an increase in the size of the issue queue circuitry 20 to accommodate the wide operands used by such wide operand execution units.

Figure 2:
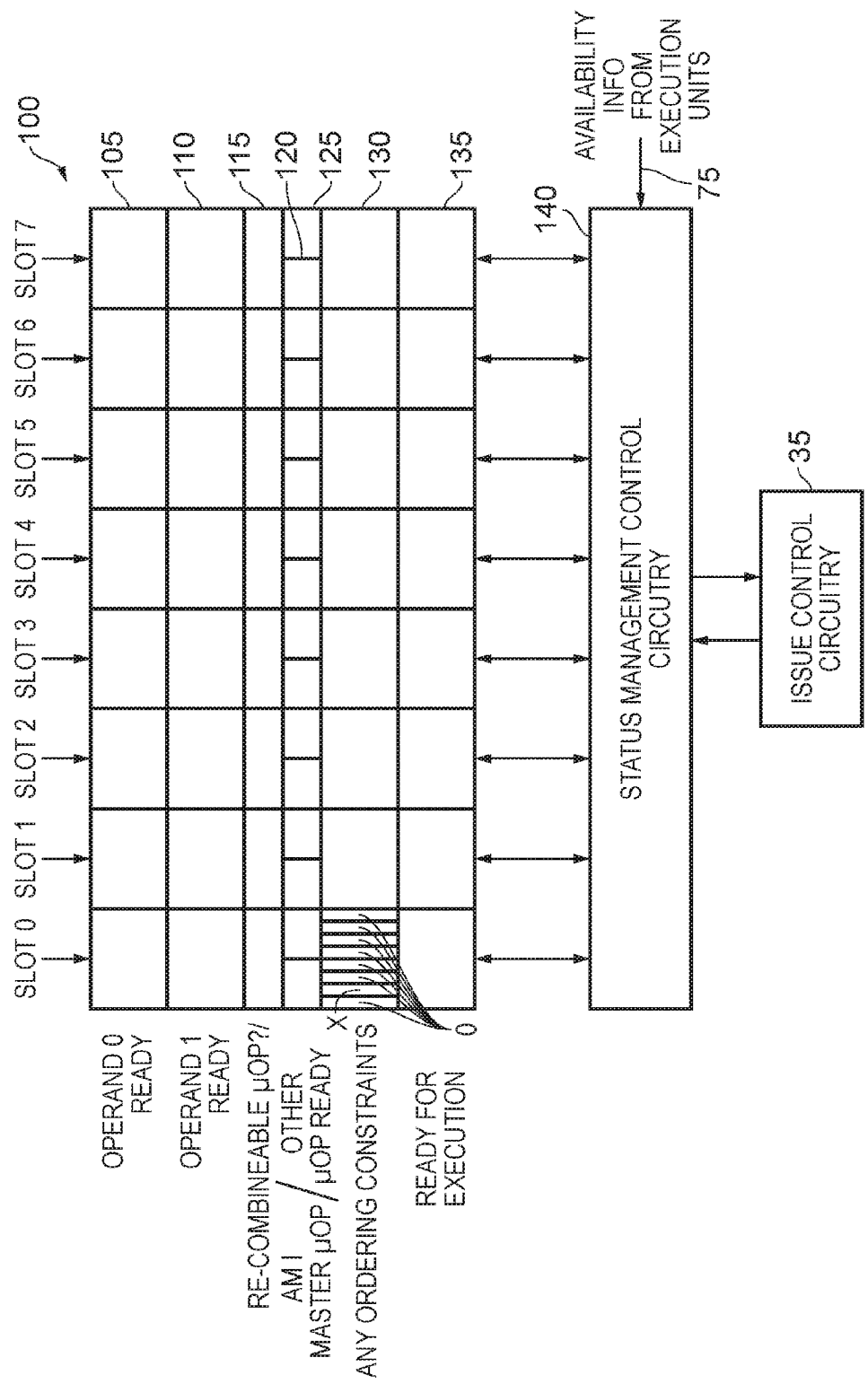
FIG. 2 is a diagram illustrating in more detail the ready for execution determination circuitry of FIG. 1 in accordance with one embodiment.

FIG. 2 is a diagram providing more details of the ready for execution determination circuitry 30 of FIG. 1 in accordance with one embodiment. In one embodiment, the issue queue 25 comprises eight slots, and the ready for execution determination circuitry 30 maintains status information storage 100 providing a sequence of status information for each slot. In particular, the status management control circuitry 140 maintains the status information within the status information storage 100.

For each slot, two operand ready fields 105, 110 are provided which are set when the corresponding operand data OP0 or OP1 has been stored within the associated slot. Further, a combine field 115 is provided which is set if the micro-op stored in the corresponding slot is a re-combinable micro-op. If the field 115 is set (in one embodiment, if this field is set, its value identifies the other slot containing the other re-combineable micro-op), then two further sub-fields 120 and 125 are used to identify whether the micro-op in the associated slot is the master micro-op, and if it is, then whether the other micro-op to be recombined with it is ready for execution.

In the field 130, any ordering constraints can be identified. In particular, where out of order execution is allowed, there will often be certain ordering constraints that need to be observed, and the field 130 can be used to ensure those ordering constraints are observed. In one particular embodiment, the field 130 for each slot has a status bit for each of the other slots, which is used to identify whether any of those other slots contain micro-ops which must be executed before the micro-op associated with the field 130. Hence, in the particular example shown for slot 0, the field 130 identifies that the micro-op stored in slot 1 must be executed before the micro-op in slot 0.

The ready for execution field 135 is set in dependence on the contents of the other status fields discussed above, and dependent on the availability information received by the status management control circuitry 140 over path 75 from the execution units of the execution circuitry 50. This will be discussed in more detail later with reference to FIG. 5.

The status management control circuitry 140 reports to the issue control circuitry 35 as to the status of the ready for execution field 135 for each of the slots. Based on this information, the issue control circuitry 35 determines which micro-ops are to be issued to the execution circuitry during any particular issue cycle. In one particular embodiment, up to two micro-ops can be issued per cycle. Where more than two slots contain micro-ops that are ready for execution, the issue control circuitry 35 applies an arbitration operation in order to determine which micro-ops are to be issued to the execution circuitry 50 in any particular cycle.

Figure 3A:
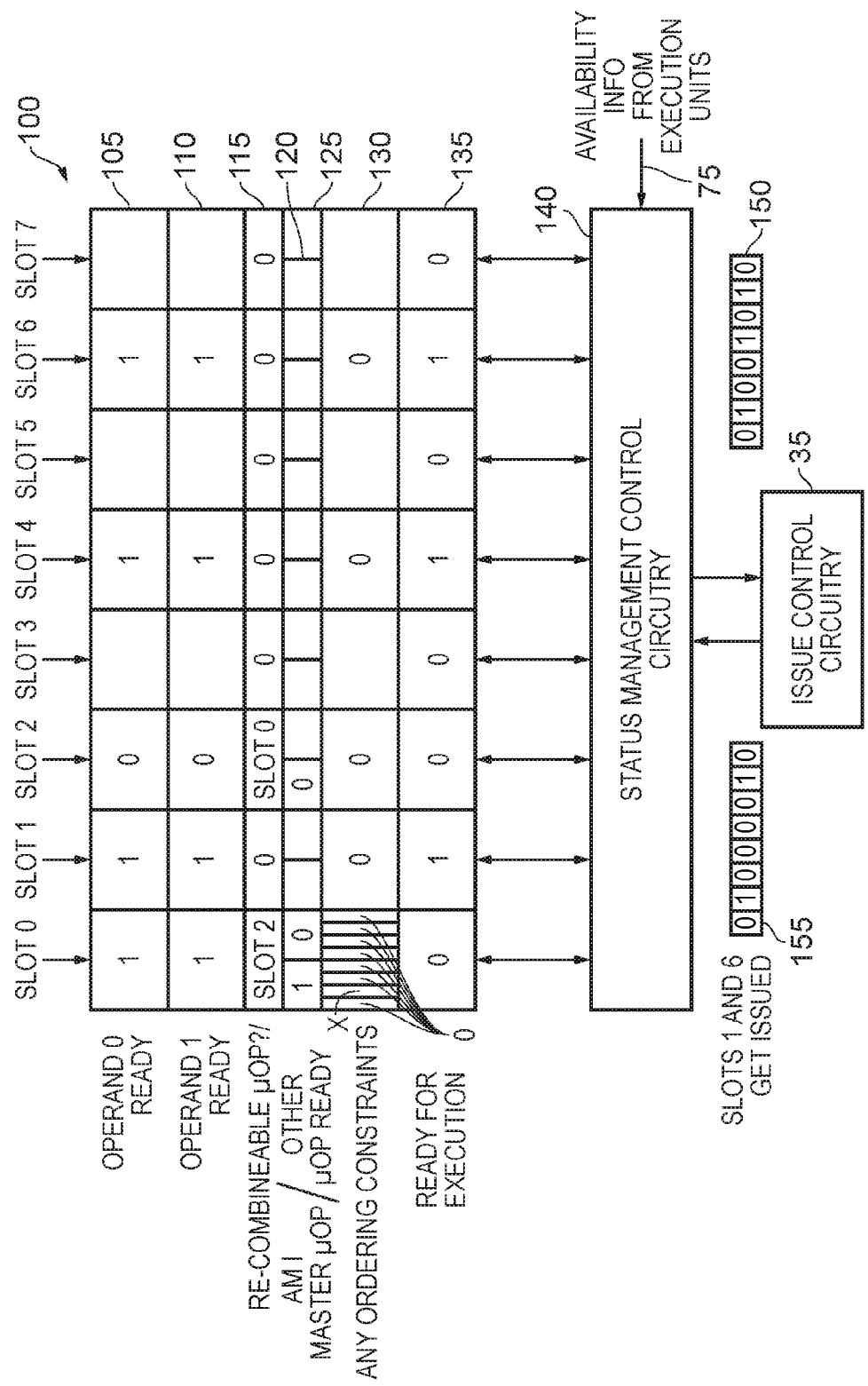
FIGS. 3A and 3B schematically illustrate the operation of the circuitry of FIG. 2 in accordance with two example scenarios.

FIG. 3A illustrates a particular example of status information within the status information storage 100. For any boxes within the status information storage 100 where no value is shown, this indicates that the value is not relevant to the decision taken as to which micro-ops to issue to the execution circuitry based on the status information within the status information storage 100. In the example of FIG. 3A, a value of 1 indicates a set state for that status information, and a value of zero indicates an unset/clear state. In the particular example of FIG. 3A, slots 0 and 2 store re-combinable micro-ops, the field 115 for slot 0 identifying that slot 2 stores the other re-combinable micro-op, and the field 115 for slot 2 identifying that slot 0 stores the other re-combinable micro-op. As indicated by the logic 1 value in field 120 for slot 0, slot 0 is considered to be the master slot. The logic zero value in field 120 for slot 2 indicates that slot 2 is the slave slot.

Even though both of the fields 105 and 110 for slot 0 have been set to indicate that the associated operands are ready, slot 0 cannot be marked as ready for execution since the ordering constraint information indicates that the micro-op in slot 1 needs to be executed first. In addition, the operand data for the slave slot (slot 2) is not ready, and this is another reason why slot 0 cannot be marked as ready for execution.

In this particular example, it is assumed that slots 1, 4 and 6 contain micro-ops that are ready for execution. In particular, for each of the slots, the corresponding operand data is available, and there are no ordering constraints preventing their execution. It is also assumed that the availability information received over path 75 identifies that the execution units that are to receive those micro-ops are also available.

Accordingly, the status management control circuitry 140 sends the vector 150 to the issue control circuitry 35 to identify that slots 1, 4 and 6 are ready for execution. Since more than two slots are ready for execution, the issue control circuitry applies an arbitration operation in order to decide which two slots to be issued. Any suitable arbitration operation may be applied. However, in one particular embodiment, the arbitration operation selects the first slot that is ready for execution, when evaluating from each end of the vector. Hence, in this example, slots 1 and 6 are selected for execution, and the vector 155 is returned to the status management circuitry 140 to identify that slots 1 and 6 should have the corresponding micro-ops issued to the execution circuitry. The routing circuitry 40 then routes the identified micro-ops, and their associated operand data, to the relevant execution units within the execution circuitry 50.

Figure 3B:
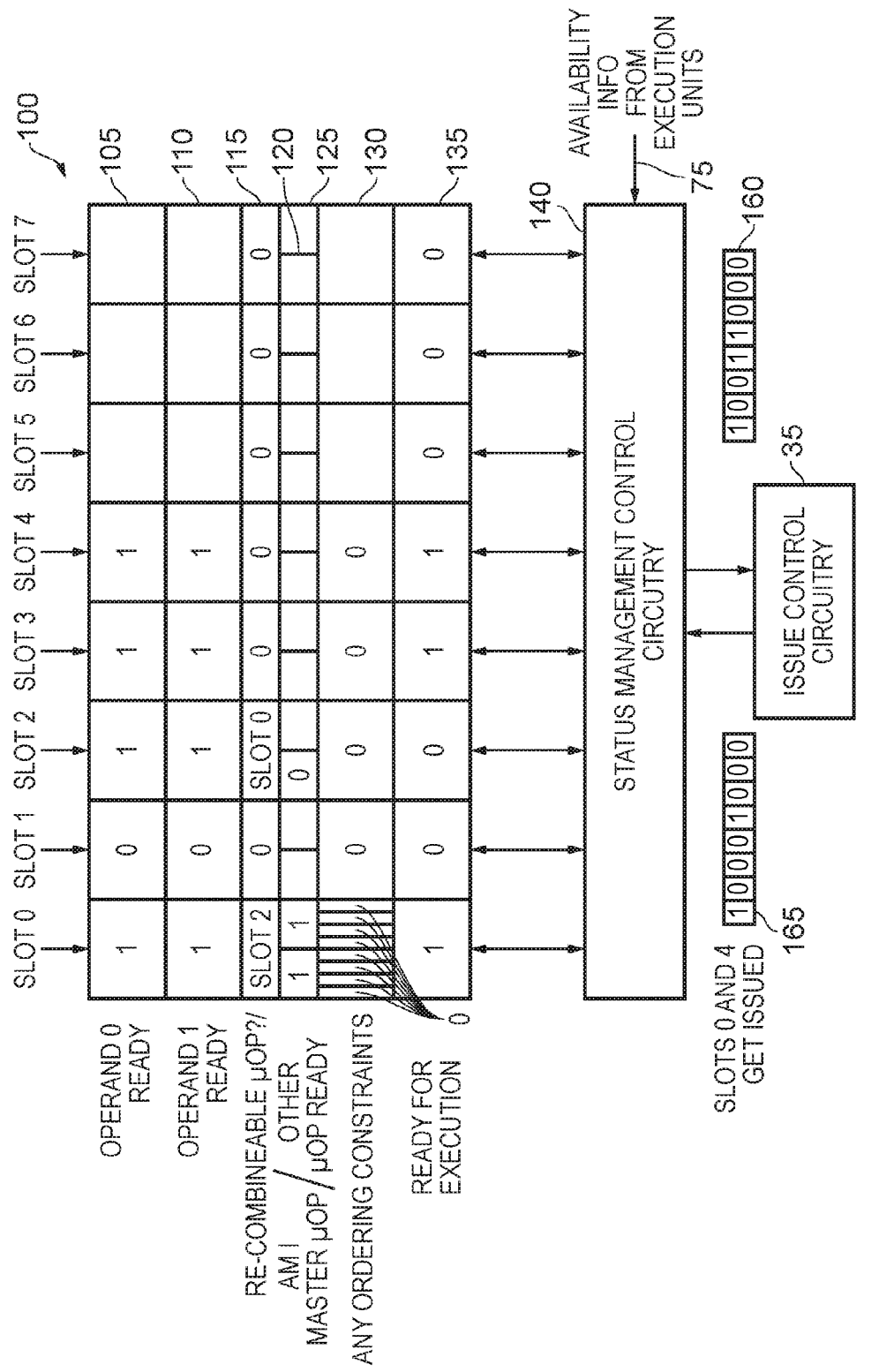

FIG. 3B then illustrates the operation of the circuitry of FIG. 2 in a subsequent issue cycle. At this point, both of the items of operand data associated with the micro-op in slot 2 are now available, and accordingly the field 125 associated with slot 0 has been set to a logic one value. In addition, since the micro-op in slot 1 has now been issued, the ordering constraint information in field 130 for slot 0 is reset. As a result, the ready for execution field 135 is now set for slot 0, since both the master micro-op in slot 0 and the other re-combinable micro-op in slot 2 are ready for execution.

The status information associated with slot 4 is unchanged, and accordingly the micro-op associated with slot 4 is ready for execution. In addition, it is assumed at this time that the micro-op associated with slot 3 is also ready for execution. As a result, the status management control circuitry 140 issues the vector 160 to the issue control circuitry 35, identifying that slots 0, 3 and 4 are ready for execution. Application of the arbitration operation by the issue control circuitry 35 causes the vector 165 to be returned to the status management control circuitry 140, identifying that slots 0 and 4 should have their stored micro-ops issued by the routing circuitry 40 to the relevant execution units within the execution circuitry 50. For slot 0 the routing circuitry 40 will then recombine the micro-ops in slots 0 and 2 to form a single combined micro-op for issuance to the relevant wide operand execution unit 60, 65, along with the operand data stored in both slots.

Figure 4:
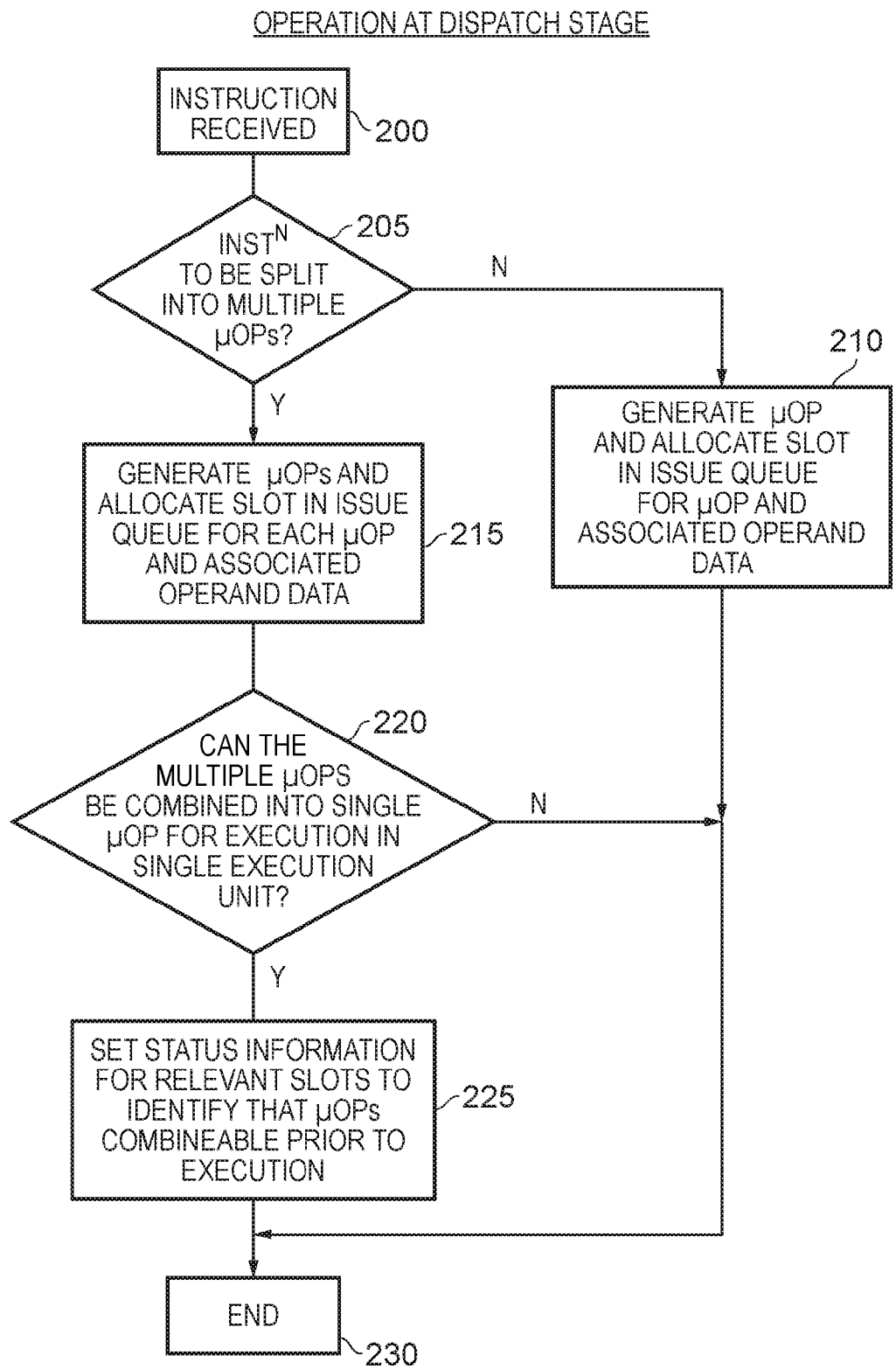
FIG. 4 is a flow diagram illustrating the operation of the data processing apparatus of FIG. 1 at the dispatch stage, in accordance with one embodiment.

FIG. 4 is a flow diagram illustrating the operation of the data processing apparatus of FIG. 1 at the dispatch stage, in accordance with one embodiment. At step 200, an instruction is received by the decoder 10, whereafter at step 205 it is determined by the decoder whether the instruction is to be split into multiple micro-ops. If not, then the process merely proceeds to step 210, where the decoder generates the appropriate micro-op for the instruction, and a slot is allocated in the issue queue 25 for storage of the generated micro-op, and its associated operand data. Thereafter, the process ends at step 230.

If, at step 205, it is determined that the instruction is to be split into multiple micro-ops, then at step 215 the decoder 10 generates the required micro-ops and a slot is allocated in the issue queue for each of those micro-ops and its associated operand data.

Whilst it is possible that the decision to split the instruction into multiple micro-ops could be taken for a variety of reasons, in one embodiment the decoder 10 will split the instruction into multiple micro-ops in situations where the instruction is to be executed by a wide operand execution unit 60, 65 within the execution circuitry 50, with the intention then being to recombine those micro-ops into a single combined micro-op prior to issue to that wide operand execution unit. According, at step 220, it is determined whether the multiple micro-ops can be recombined into a single combined micro-op for execution in a single execution unit of the execution circuitry 50. If not, no further action is necessary, and the process proceeds to step 230. However, if the multiple micro-ops can be recombined into a single micro-op for execution in a single execution unit, then the process proceeds to step 225, where the status information for the relevant slots is set to identify that those micro-ops are re-combinable prior to execution (for example by setting of the appropriate fields 115, 120, 125 discussed earlier with reference to FIG. 2). Thereafter, the process ends at step 230.

Whilst in FIG. 4 the two decision blocks 205 and 220 are shown separately, in an alternative embodiment the evaluations required by those decision blocks can be performed in parallel, such that in the event that an instruction is to be split into separate micro-ops for later recombining into a single micro-op, then the required steps 215 and 225 can be performed in parallel.

Figure 5:
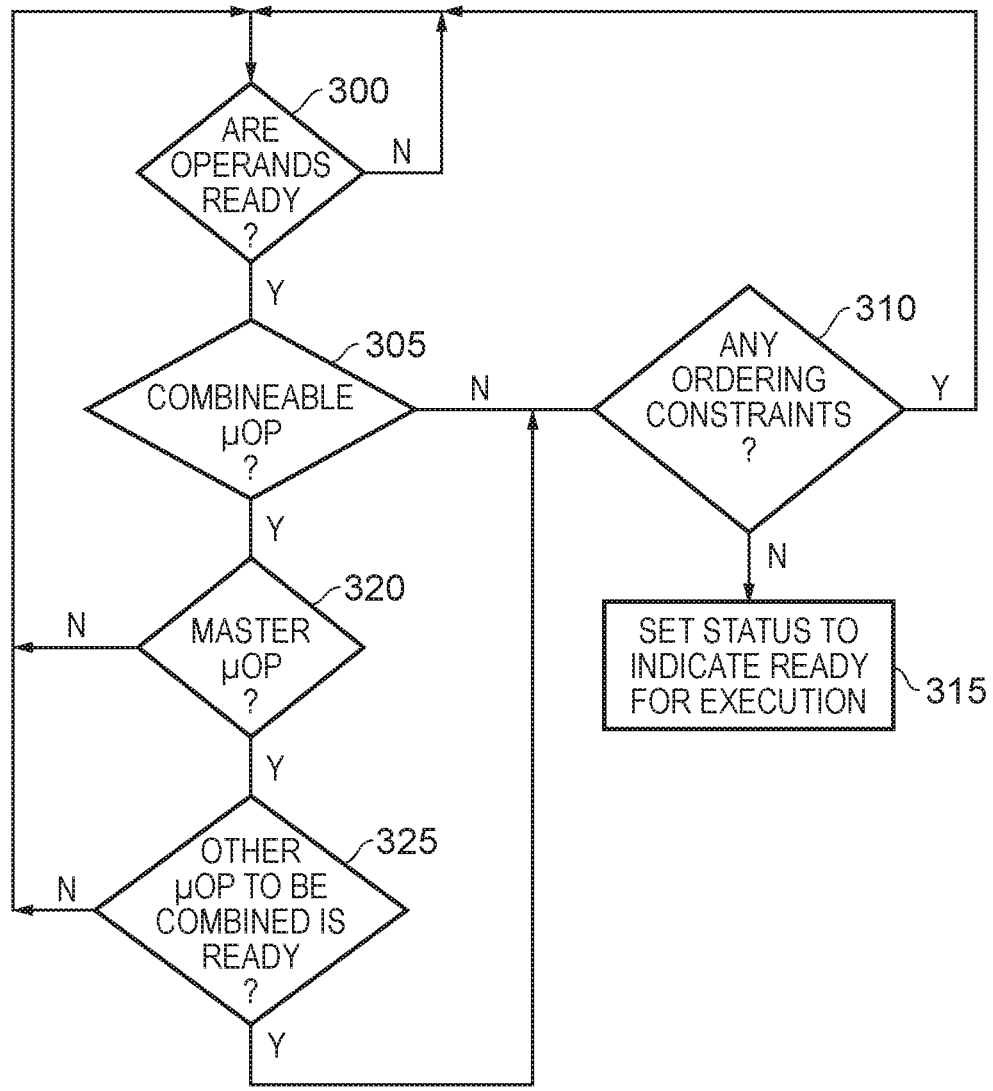
FIG. 5 is a flow diagram illustrating how the status information of FIG. 2 is used in accordance with one embodiment.

FIG. 5 is a flow diagram illustrating how the status management control circuitry 140 determines, for each slot, whether to set the associated ready for execution field 135, dependent on the status of the various pieces of status information maintained within the status information storage 100. At step 300, it is determined whether the operand data is ready, i.e. whether the operand data has been stored within the associated slot. If not, then the process merely returns to step 300 until such time as the operand data is available.

Once the operand data is available, the process proceeds to step 305, where it is determined whether the micro-op stored in the associated slot is a re-combinable micro-op. If not, then the process proceeds to step 310, where it is determined whether any ordering constraints are relevant to the micro-op stored in the associated slot. If not, then the ready for execution field for that slot can be set at step 315. Otherwise, the process returns to step 300.

If, at step 305, it is determined that the micro-op in the associated slot is a re-combinable micro-op, then it is determined at step 320 whether that micro-op is the master micro-op. If not, no further action is taken, and the process returns to step 300. However, if it is the master micro-op, then the process proceeds to step 325, where it is determined whether the other micro-op to be combined with that master micro-op is ready for execution. If not, the process returns to step 300. However, if it is ready for execution, then the process proceeds to step 310, whereafter the above described steps are performed (and hence the slot will be marked as ready for execution provided that there are no ordering constraints that are still active).

Whilst the steps of FIG. 5 have been shown sequentially, it will be appreciated that the evaluations identified by various of those steps could be performed in parallel if desired. Further, for the purposes of FIG. 5, it is assumed that the relevant execution unit to receive the micro-op is available (as indicated by the data received over path 75). If not, the ready for execution field will not be set.

Whilst in the above described embodiments, the same status information fields are provided for each of the slots, this is not essential, and in an alternative embodiment some of the slots may be considered to be standard slots which can be used to accommodate any micro-ops other than the slave micro-ops of a re-combinable pair of micro-ops, with one or more further slots being reserved for such re-combinable slave micro-ops. The amount of status information that needs to be maintained for such slave micro-ops is reduced, since there is no requirement for those slave micro-ops to be separately marked as ready for execution, nor is there any need to separately maintain any ordering constraint information for those slave micro-ops. This can hence lead to some reduction in the size of the status information storage 100, at the cost of a reduction in the flexibility in allocating slots to individual micro-ops.

In one embodiment, the ready for execution determination circuitry 30 of the issue queue circuitry 20 will always aim, as a default position, to recombine the two re-combinable micro-ops into a combined micro-op to be issued to the relevant wide operand execution unit. However, in one particular embodiment, the ready for execution determination circuitry 30 may be responsive to detection of a predetermined condition to determine that the two re-combinable micro-ops should not be issued as a combined micro-op to the wide operand execution unit, and instead should each be issued separately to a suitable execution unit within the execution circuitry 50. As an example, in a situation where at least some of the operand data is delayed and/or the wide operand execution unit is not available for a prolonged period, it may be determined that it is no longer appropriate to wait to be in a position where the re-combinable micro-ops can be recombined into a single combined micro-op for issuance to the wide operand execution unit.

Hence, considering the earlier example of a MAC instruction, if the operand data available for the multiply operation is available, but there is some delay in receiving the other item of operand data required for the accumulate operation, or if the MAC unit 60 is unavailable for a prolonged period, it may be decided instead to update the field 115 associated with the relevant slots holding the two re-combinable micro-ops, to identify that those micro-ops are no longer considered to be re-combinable micro-ops. The slot containing the micro-op identifying the accumulate operation would then have its ordering constraint information set to identify that the slot containing the micro-op for the multiply operation needs to be performed first.

As another example, if some of the operand data for a SIMD instruction is delayed, then the status management control circuitry 140 may decide to update the field 115 for the relevant slots to identify that the two micro-ops are no longer re-combinable. The operation specified by the SIMD instruction can then be performed on some of the operand data by issuing a first of the (previously re-combinable) micro-ops to the execution circuitry (whether the SIMD unit or some other unit within the execution circuitry), and then in a later clock cycle the operation specified by the SIMD instruction can be performed on the remainder of the operand data by issuing the second micro-op to the execution circuitry.

It will be appreciated that the above described embodiments provide a mechanism that allows the performance benefits of using wide operand execution units to be retained, whilst alleviating the associated size requirements of the issue queue.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, comprising:
   execution circuitry comprising a number of execution units, including a first operand execution unit configured to allow up to N bits of operand data to be processed during execution of a single instruction, where N is an integer greater than 0;
   decoder circuitry configured to decode each instruction to be executed by the execution circuitry in order to generate for each instruction at least one control data block identifying an operation to be performed by the execution circuitry in order to execute said instruction;
   issue queue circuitry providing an issue queue having a plurality of slots, each slot configured to store one control data block generated by the decoder circuitry along with up to M bits of operand data associated with that control data block, where M is less than N and is an integer greater than 0;
   the issue queue circuitry configured to issue control data blocks and associated operand data from the issue queue to the execution circuitry for processing;

the decoder circuitry being responsive to receiving an instruction suitable for execution by said first operand execution unit and requiring more than M bits, but no more than N bits, of operand data to be processed during execution, to generate at least two re-combineable control data blocks for said instruction suitable for execution by said first operand execution unit;

the issue queue circuitry configured to allocate a slot in the issue queue for each of said at least two re-combineable control data blocks and up to M bits of associated operand data, and to mark those allocated slots to identify that they contain re-combineable control data blocks;

the issue queue circuitry being configured, responsive to a determination that said at least two re-combineable control data blocks are to be issued to said first operand execution unit, to re-combine said at least two re-combineable control data blocks into a combined control data block, and to issue the combined control data block to said first operand execution unit along with the operand data contained in each of the allocated slots for said at least two re-combineable control data blocks.

2. A data processing apparatus as claimed in claim 1, wherein said issue queue circuitry maintains status information for each slot of said issue queue, said status information identifying which slots have been allocated for said at least two re-combineable control data blocks.

3. A data processing apparatus as claimed in claim 2, wherein said status information comprises a combine field associated with each slot, the issue queue circuitry being configured to set a value in each combine field to identify whether the associated slot contains one of said re-combineable control data blocks.

4. A data processing apparatus as claimed in claim 3, wherein for at least one of the slots allocated for said at least two re-combineable data blocks, the issue queue circuitry is configured to identify within the associated combine field each other slot that contains one of said at least two re-combineable control data blocks.

5. A data processing apparatus as claimed in claim 2, wherein said status information includes ready for execution information set by the issue queue circuitry to identify which slots contain a control data block that is ready to be executed by the execution circuitry.

6. A data processing apparatus as claimed in claim 5, wherein for the slots allocated for said at least two re-combineable control data blocks, the issue queue circuitry is configured to defer setting the ready for execution information for any of those slots until all of said at least two re-combineable control data blocks are ready for execution.

7. A data processing apparatus as claimed in claim 6, wherein when all of said at least two re-combineable control data blocks are ready for execution, the issue queue circuitry is configured to set the ready for execution information to identify, as ready for execution, a predetermined one of the slots allocated for said at least two re-combineable control data blocks.

8. A data processing apparatus as claimed in claim 5, wherein said issue queue circuitry determines, for each slot, whether the control data block allocated to that slot is ready to be executed, dependent on whether the associated operand data is available in that slot.

9. A data processing apparatus as claimed in claim 8, wherein said status information includes an operand status field for each slot, and the issue queue circuitry is configured to set said operand status field when the associated operand data is available within said slot.

10. A data processing apparatus as claimed in claim 5, wherein the issue queue circuitry is configured to receive information from the execution circuitry as to the availability of each execution unit to receive at least one control data block for processing, and the issue queue circuitry determines, for each slot, whether the control data block allocated to that slot is ready to be executed, dependent on whether the execution unit capable of processing that control data block is available.

11. A data processing apparatus as claimed in claim 5, wherein said status information comprises ordering constraint information, and the issue queue circuitry is configured to determine that the control data block allocated to a particular slot is not ready to be executed when the ordering constraint information identifies at least one other slot that contains a control data block that requires processing prior to the control data block in the particular slot.

12. A data processing apparatus as claimed in claim 5, wherein:
the issue queue circuitry is configured to issue up to X control data blocks to the execution circuitry per issue cycle, where X is an integer greater than 0; and
the data processing apparatus further comprises issue control circuitry configured to perform an arbitration operation when the ready for execution information set by the issue queue circuitry identifies more than X slots as containing a control data block that is ready to be executed by the execution circuitry.

13. A data processing apparatus as claimed in claim 1, further comprising:
a register file configured to store operand data; and
a forwarding path configured to directly provide, to the issue queue, result operand data generated by said execution circuitry for storage within the register file;
wherein the issue queue has operand access circuitry connected to both the register file and the forwarding path and configured to store, within each slot, the associated operand data for the control data block allocated to that slot.

14. A data processing apparatus as claimed in claim 1, wherein:
said first operand execution unit comprises a SIMD (Single Instruction Multiple Data) execution unit configured to perform an operation in parallel on a plurality of data values;
said instruction suitable for execution by said first operand execution unit is a SIMD instruction, and each item of operand data specified by the SIMD instruction comprises multiple data values.

15. A data processing apparatus as claimed in claim 1, wherein:
said execution circuitry is configured to execute instructions from an instruction set;
said instruction suitable for execution by said first operand execution unit is a complex instruction within said instruction set, said complex instruction specifying a sequence of operations, and said complex instruction specifying more items of operand data than are specified by at least one other instruction in said instruction set.

16. A data processing apparatus as claimed in claim 15, wherein:
said complex instruction is a multiply-accumulate (MAC) instruction specifying both a multiply operation to be performed using first and second operand data, and an accumulate operation to be performed using third operand data and the result operand data generated by performance of said multiply operation; and said first operand execution unit comprises a multiply accumulate (MAC) unit configured to receive the first, second and third operand data as inputs, and to perform the multiply operation and the accumulate operation specified by the MAC instruction.

17. A data processing apparatus as claimed in claim 1, wherein:
the issue queue circuitry is configured, responsive to detection of a predetermined condition, to determine that said at least two re-combineable control data blocks should not be issued as said combined control data block to said first operand execution unit, and to instead issue each of said at least two re-combineable control data blocks separately to the execution circuitry along with its associated operand data.

18. A data processing apparatus as claimed in claim 17, wherein when the operation specified by each of said at least two re-combineable control data blocks is capable of being performed by the execution circuitry independently of the operation specified by each other of said at least two re-combineable control data blocks, said predetermined condition is detected by the issue queue circuitry when a time threshold is reached without at least one of: (i) the operand data for at least one of the re-combineable control data blocks being available in the associated slot, and (ii) said first operand execution unit being available.

19. A data processing apparatus as claimed in claim 1, wherein:
said plurality of slots comprise a plurality of standard slots and a number of further slots reserved for re-combineable control data blocks;
the issue queue is responsive to said decoder circuitry generating said at least two re-combineable control data blocks, to allocate a first of said at least two re-combinable control data blocks to one of said standard slots, and to allocate each other of said at least two re-combineable control data blocks to one of said further slots.

20. A method of controlling use of an issue queue within a data processing apparatus having execution circuitry comprising a number of execution units, including a first operand execution unit configured to allow up to N bits of operand data to be processed during execution of a single instruction, where N is an integer greater than 0, the method comprising:
decoding each instruction to be executed by the execution circuitry in order to generate for each instruction at least one control data block identifying an operation to be performed by the execution circuitry in order to execute said instruction;
providing the issue queue with a plurality of slots, each slot for storing one control data block generated by the decoding step along with up to M bits of operand data associated with that control data block, where M is less than N and is an integer greater than 0;
issuing control data blocks and associated operand data from the issue queue to the execution circuitry for processing;
at said decoding step, responsive to receiving an instruction suitable for execution by said first operand execution unit and requiring more than M bits, but no more than N bits, of operand data to be processed during execution, generating at least two re-combineable control data blocks for said instruction suitable for execution by said first operand execution unit;
allocating a slot in the issue queue for each of said at least two re-combineable control data blocks and up to M bits of associated operand data, and marking those allocated slots to identify that they contain re-combineable control data blocks;
at said issuing step, responsive to a determination that said at least two re-combineable control data blocks are to be issued to said first operand execution unit, re-combining said at least two re-combineable control data blocks into a combined control data block, and issuing the combined control data block to said first operand execution unit along with the operand data contained in each of the allocated slots for said at least two re-combineable control data blocks.

21. A data processing apparatus, comprising:
a number of means for executing instructions including means for processing up to N bits of operand data during execution of a single instruction, where N is an integer greater than 0;
means for decoding each instruction to be executed by the number of means for executing instructions in order to generate for each instruction at least one control data block identifying an operation to be performed by the number of means for executing instructions in order to execute said instruction;
a plurality of means for storing one control data block generated by the means for decoding along with up to M bits of operand data associated with that control data block, where M is less than N and is an integer greater than 0;
means for issuing control data blocks and associated operand data from the plurality of means for storing one control data block to the execution means for processing;
responsive to receiving an instruction suitable for execution by said means for processing up to N bits of operand data and requiring more than M bits, but no more than N bits, of operand data to be processed during execution, the means for decoding configured to generate at least two re-combineable control data blocks for said instruction suitable for execution by said means for processing up to N bits of operand data;
means for allocating a means for storing for each of said at least two re-combineable control data blocks and up to M bits of associated operand data, and for marking those allocated means for storing to identify that they contain re-combineable control data blocks;
means, responsive to a determination that said at least two re-combineable control data blocks are to be issued to said means for processing up to N bits of operand data, for re-combining said at least two re-combineable control data blocks into a combined control data block, and for issuing the combined control data block to said means for processing up to N bits of operand data along with the operand data contained in each of the allocated means for storing for said at least two re-combineable control data blocks.

* * * * *